United States Patent

Fettweis

[15] 3,641,271

[45] Feb. 8, 1972

[54] RESONANT TRANSFER CIRCUITS

[72] Inventor: Alfred Leo Maria Fettweis, Mol, Belgium

[73] Assignee: International Standard Electric Corporation

[22] Filed: June 22, 1970

[21] Appl. No.: 48,956

[30] Foreign Application Priority Data

Mar. 25, 1966 Netherlands..........................6603926

[52] U.S. Cl.........................................................179/15 AA

[51] Int. Cl...........................................................H04j 3/00

[58] Field of Search............................................179/15 AA

[56] References Cited

FOREIGN PATENTS OR APPLICATIONS 300,747 9/1965 Netherlands......................179/15 AA

*Primary Examiner*—Ralph D. Blakeslee

*Attorney*—C. Cornell Remsen, Jr., Rayson P. Morris, Percy P. Lantzy, J. Warren Whitesel, Phillip A. Weiss and Delbert P. Warner

[57] ABSTRACT

A generalized time invariant filter for use in resonant transfer circuits.

5 Claims, 6 Drawing Figures

RESONANT TRANSFER CIRCUITS

Figure 1:
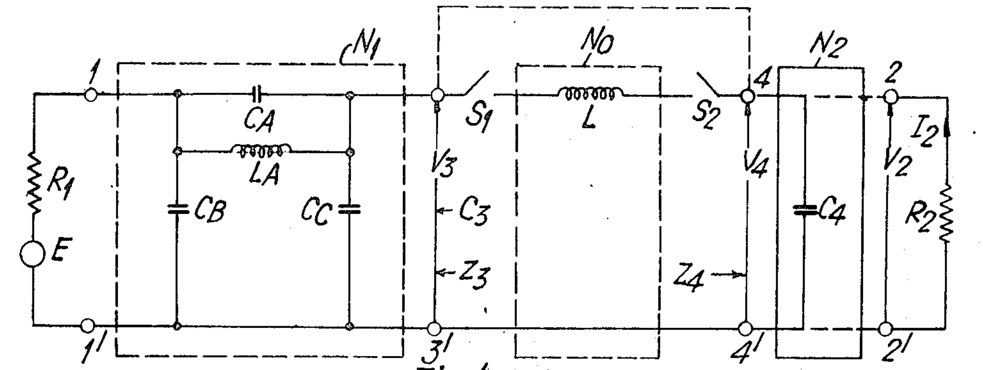

The invention relates to resonant transfer circuits including first and second filter networks each with energy storage means and interconnected on a resonant transfer basis by a resonant transfer network including at least a reactive element and repeatedly operating switching means. The transfer characteristic of the resonant transfer connection is substantially equal to the transfer characteristic of a modified time invariant circuit.

Resonant transfer circuits of this type and more particularly a low-pass filter therefor have already been disclosed in the U.S. Pat. No. 3,100,820. Therein, a particular design of a low-pass filter especially suitable for resonant transfer operation is described. The design of such a low-pass filter reverting to the use of a so-called equivalent passive circuit, i.e., time invariant which corresponds to the original filter network in which the transfer inductance used as the resonant transfer network has disappeared and in which moreover the filter network itself has been modified to cope with the fact that whereas the open-circuit impedances of the two networks seen from the low-frequency side are the same, the short circuit performance (short circuit on the high-frequency or highway side of the networks) warrants of course a design modification. Thus, the two networks are not equivalent since while a resonant transfer filter may usually be designed on an open-circuit basis so that the open-circuit performance from the low-frequency side will be the same for the equivalent network as for the original one, as stated above, this cannot be true for the short circuit impedance characteristic.

The general theory of resonant transfer circuits has been disclosed in the Belgian Pat. No. 655,952 but this does not solve the actual design problem of filters suitable for practical resonant transfer operation. As mentioned above, these may generally be designed on an open circuit filter basis wherein the performance of the filter may be improved by the use of a correcting impedance structure in the manner disclosed in the French Pat. No. 1,348,372.

The general object of the invention is to facilitate the design of filter networks for resonant transfer operation. It is based on the insight that when the sampling rate is sufficiently large with respect to the bandwidth of the filter, a particularly simple correspondence exists between a time invariant network which can be used for the design and the actual filter networks involved in the resonant transfer connection.

In accordance with the main characteristic of the invention, in resonant transfer circuits of the type initially defined, said modified circuit is obtained from the original circuit by replacing the resonant transfer network by a modified network.

In accordance with a further characteristic of the invention, said modified time invariant circuit includes the unmodified first and second filter networks.

Thus, the modified time invariant network now includes the original filter networks interconnected by a modified network which replaces the actual resonant transfer network. This means that the method is general when such a correspondence exists and is not limited to any particular filter design.

In accordance with a further characteristic of the invention, in the case of a direct resonant transfer connection, said modified network is constituted by direct interconnecting means between said filter networks.

In accordance with a further characteristic of the invention, the pulse impedances $Z_p$ of each of said filter networks and which are defined by $$Z_p = \sum_{m=\infty}^{\infty} Z(p+mP),$$

wherein $p$ is the imaginary angular frequency, $P$ the imaginary angular sampling frequency at which said switching means are repeatedly operated, $Z(p)$ is the output impedance seen into the filter network from said resonant transfer network and $m$ an integer taking all negative and positive values, are substantially equal to the respective input impedances $Zi(p)$.

In accordance with yet a further characteristic of the invention, $P$ is large with respect to the pass-bands of said filter networks.

Thus, when the sampling frequency is large enough with respect to the filter bandwidth, the modified network is most simple since it does not in fact exist, there being a mere interconnection between the original first and second filter networks in order to compute the transmission characteristic.

The above is true in the case of a direct resonant transfer connection, but it is also known from the British Pat. No. 822,297 that intermediate storage resonant transfer can be used, thereby enabling energies to be exchanged between two terminations without necessarily operating the switching means corresponding to these terminations in unison.

In accordance with yet another characteristic of the invention, in the case of an indirect resonant transfer connection whereby said resonant transfer network includes intermediate energy storage means, said modified network is constituted by an all-pass network.

Thus, a general method of design has been found in case the sampling rate is sufficiently large with respect to the bandwidth of the filters. Both the direct and the indirect method of resonant transfer may be used and the filters need not be restricted to lowpass structures so that such designs could be useful, for instance, in carrier systems when it is desired to directly convert from low frequency or from a time diffusion multiplex system to a frequency division carrier system. As in the Belgian Pat. No. 655,952, the theory which has been developed is of course applicable to the case where the sampling pulses during the time the switches perform the repeated interconnections are short with respect to the sampling period.

Figure 2:
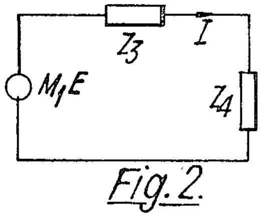
Figure 3:
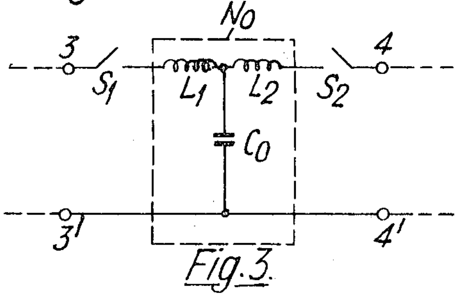
Figure 4:
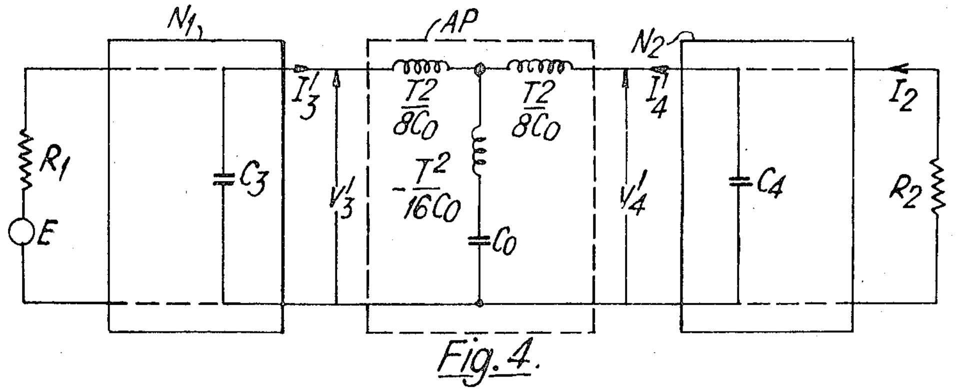
Figure 5:
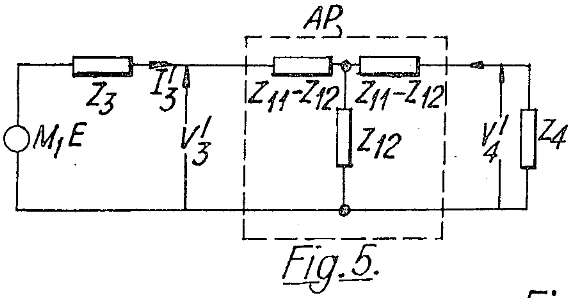

The above and other objects and features of the invention as well as the best manner of attaining them and the invention itself will be better understood from the following description of embodiments thereof to be read in conjunction with the accompanying drawings which represent:

FIG. 1, a general bidirectional resonant transfer circuit;

FIG. 2, a circuit for a time invariant modification of the circuit of FIG. 1;

FIG. 3, a modification of the actual resonant transfer network included in FIG. 1 to enable resonant transfer using the intermediate storage principle;

FIG. 4, a time invariant network related to the circuit of FIGS. 1 and 3;

FIG. 5, a circuit equivalent to that shown in FIG. 4; and

Figure 6:
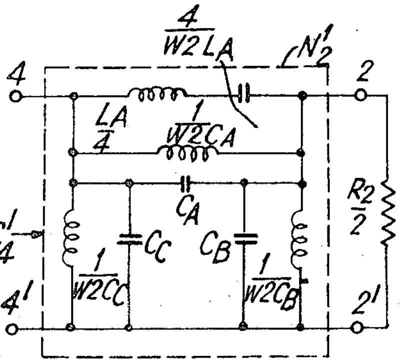

FIG. 6, a modification of FIG. 1 according to which one of the lowpass filters thereof is transformed into a bandpass filter.

Referring to FIG. 1, the latter shows a general resonant transfer transmission circuit between a source of voltage E and resistance $R_1$ and a load $R_2$. The terminals of the source are labeled 1–1′ while those of the load are indicated by 2–2′. These pairs of terminals are coupled through three networks in cascade. The first is $N_1$ coupled between terminals 1–1′ and terminals 3–3′, the second is $N_2$ coupled between terminals 2–2′ and terminals 4–4′. These two networks, the first on the side of the source of resistance $R_1$ and the second on the side of the load $R_2$ are filter networks which may be assumed to be identical so that only $N_1$ is shown in detail as a $\pi$-structure with three capacitances $C_A$, $C_B$ and $C_C$ and with the series capacitance $C_A$ shunted by the inductance $L_A$. These are thus lowpass filters with an attenuation pole which might conveniently be located at the sampling frequency of the switches $S_1$ and $S_2$ which are seen to be series switches permitting coupling of terminals 3 and 4 through the central network $N_O$, the terminals 3′ and 4′ being directly interconnected since an unbalanced structure is assumed. The network $N_O$ is the actual resonant transfer network and by way of illustration it has been shown to include merely a series inductance which will thus interconnect the terminals 3 and 4 upon the make contact $S_1$ and $S_2$ being simultaneously closed. This corresponds to the case of the so-called direct resonant transfer circuit. If intermediate storage is used, i.e., if the network $N_0$ includes an intermediate storage capacitance as will be discussed later, then it is no longer necessary to have the switches $S_1$ and $S_2$ closed in unison but on the contrary, they will be repeatedly closed at the same sampling rate but at different instants.

The general transmission theory of resonant transfer networks has been disclosed in the Belgian Pat. No. 655,952. According to this theory, so-called conversion coefficients have been defined by analogy with the transfer coefficients which are well known in transmission theory for ordinary time invariant networks.

Such conversion coefficients correspond for a sampled resonant transfer connection in which the switches $S_1$ and $S_2$ are closed during periods of time which are repeated and short with respect to the sampling period T, to the square root of the ratio between the power in the load and the maximum which is available from the source.

For a resonant transfer transmission of the type shown in FIG. 1, i.e., a direct resonant transfer transmission assumed to be ideal, i.e., with no losses and no reflections, the conversion coefficient of order $n$ may be defined by $$S_{21n}=\frac{2\sqrt{R_1R_2}M_1(p)M_2(p+nP)}{Z_{p3}+Z_{p4}} \quad (1)$$

magnitude which already appeared in the above-mentioned Belgian patent. In this equation, $M_1$ $(p)$ represents the open circuit voltage ratio of network $N_1$. Thus, it represents the ratio between the voltages $V_3$ and E, the first seen at the terminal 3–3′ when the network is terminated as shown by $R_1$, E at terminals 1–1′ and is left open circuited at terminals 3–3′, i.e., with switch $S_1$ open. This ratio is a function of $p$ the imaginary angular frequency. Likewise, $m_2(p+nP)$ is the corresponding open circuit voltage ratio for network $N_2$, that is to say the ratio between the voltages $V_4$ and E, the first seen across terminals 4–4′ with $R_2$, E across terminals 2–2′ and an open circuit on the side of 4–4′, i.e., $S_2$ open. In this relation, $P$ represents the imaginary angular sampling frequency while $n$, a subscript of the conversion coefficient characterizes the harmonic of the sampling frequency corresponding to the passband of the network $N_2$. In the particular case shown in FIG. 1 however, both $N_1$ and $N_2$ are low-pass filters so that both recover low-frequency energy from the pulses and in this case $n$ is equal to 0 giving the conversion coefficient $S_{210}$. Finally, the impedances in the denominator of the expression are the so-called pulse impedances which were also previously defined in the above-mentioned Belgian patent, i.e., $$Z_{p3}=\sum_{m=-\infty}^{\infty} Z_3(p+mP)$$

$$=R_3(w)+jX_3(w)+\sum_{m=1}^{\infty}[R_3(mW+w)+R_3(mW-w)]+\ldots$$

$$\ldots+\sum_{m=1}^{\infty}[X_3(mW+w)-X_3(mW-w)] \quad (2)$$

which gives the definition of the pulse impedance $Z_{p3}$ in function of the ordinary output impedance $Z_3$ seen into the network $N_1$ of FIG. 1 from across terminals 3–3′ when the resistance $R_1$ is across terminals 1–1′. Thus, as indicated by (2) the pulse impedance $Z_{p3}$ is the sum of the ordinary output impedance $Z_3(p)$ of the network $N_1$ plus the summation of like output impedances where the imaginary angular frequency $p$ is replaced by all the sidebands of the imaginary angular sampling frequency $P$. Evidently, the pulse impedance $Z_{p4}$ will be given by an expression similar to (2) with the subscript 3 changed into 4.

The second form of (2), which is more elaborate, follows from what precedes since the first two terms out of the four terms given for $Z_{p3}$, (i.e., $R_3$ $(w)$ and $jX_3$ $(w)$) are simply the resistive and reactive components of $Z_3(p)$, $w$ representing the angular frequency. The two summations are another way of expressing the original definition of the pulse impedance which is due to the fact that the resistive component $R_3$ is an even function of $w$ whereas $X_3$ is an odd function of $w$. Thus, for the first summation in the second expression for $Z_{p3}$, it now only extends from $m=1$ to infinity since the expression under the summation sign is made out of the sum of $R_3$ $(mW+w)$ and $R_3$ $(mW-w)$ wherein $W$ represents the angular sampling frequency. As the reactive component $X_3$ is an odd instead of an even function of frequency, this explains the negative sign under the last summation of (2).

For resonant transfer circuits using capacitances as energy storing reactances, the impedances such as $Z_3$ should always be capacitive at high frequency. Indeed, it is the capacitance seen into $N_1$ from terminals 3–3′ which is the resonant transfer capacitance and the resonant transfer occurs during a very short time so that the noncapacitive elements of network $N_1$ can be disregarded. In other words, the resonant transfer capacitance $C_3$ seen into $N_1$ is defined by $$C_3=\lim_{p\to\infty}\frac{1}{pZ_3}=C_C+\frac{C_AC_B}{C_A+C_B} \quad (3)$$

and $C_4$ is an equal capacitance for network $N_2$. Considering the resistive and reactive components of $Z_3$ (the reasoning is of course entirely the same for $Z_4$), since $R_3$ is an even function of $w$ whereas $X_3$ is an odd function of $w$, $R_3$ $(w)$ reduces at least as fast as $1/w^2$ when $w$ goes towards infinity, whereas $X_3$ reduces as fast as $1/w$ in such a case. Considering now the resistive and reactive components functions of $W$ which appear in the summations of the second expression for $Z_{p3}$ in (2), this means that as $W$ tends towards infinity, the resistive component defined by the first summation in the second expression for $Z_{p3}$ will reduce to zero as fast as $1/w^2$ whereas the reactance defined by the second summation in the second expression for $Z_{p3}$ will reduce at least that fast. Under the assumption of a low-frequency narrow band circuit, these two summations will therefore be negligibly small if $w$ is a frequency falling into the pass-band or at least such that $w$ is much smaller than $W$.

In such a case, $Z_{p3}$ defined by (2) simply becomes $Z_3$. Thus, the conversion coefficient $S_{210}$ generally defined by (1) is now simply a function of the terminating resistances $R_1$, $R_2$, of the open circuit voltage ratios $M_1$, $M_2$ and of the output impedances of the networks $N_1$, $N_2$, i.e., $Z_3$, $Z_4$.

But, the time invariant network which is obtained from the time dependent network of FIG. 1 by using the dotted line connection between terminals 3 and 4 so that the resonant transfer network $N_0$ no longer plays a part in the transmission, has a transfer coefficient $S_{210}$ which is equal to the square root of the power in $R_2$ divided by the maximum power available from source E, i.e., $$S_{21}=\frac{2V_2}{E}\sqrt{\frac{R_1}{R_2}} \quad (4)$$

With a current $I_2$ flowing into load resistance $R_2$ having the direction indicated in FIG. 1, $V_2$ may be expressed in terms of $I_2$ by $$V_2=-R_2I_2 \quad (5)$$

FIG. 2 represents a network equivalent to that of FIG. 1 when the resonant transfer network $N_0$ is disregarded, a direct connection being established between terminals 3 and 4. Thus, FIG. 2 shows a source $R_1$E corresponding to the open circuit voltage appearing across terminals 3 and 3′ due to E, in series with the output impedances $Z_3$ and $Z_4$ seen from across terminals 3–3′ and 4–4′ respectively, the equivalent current $I$ flowing into this equivalent network being thus defined by $$I=\frac{M_1E}{Z_3+Z_4} \quad (6)$$

But, it is known that by reciprocity, the open circuit voltage ratio of a network in one direction is equal to the current transfer ratio of the same network in the other direction whereby if $M_2$ is the open circuit voltage ratio ($Y_4/E$ when an e.m.f. $E$ is applied at terminals 2–2' and the voltage is measured across terminals 4–4', one may thus also write $$I_2 = -M_2 I \quad (7)$$

By considering (5), (6) and (7) in relation to (4), it will be seen that the latter equation expressing the transfer coefficient or the modified circuit of FIG. 1 simply becomes the conversion coefficient $S_{210}$ generally defined by (1) when both $Z_{p3}$ and $Z_{p4}$ can be approximated to $Z_3$ and $Z_4$. This is an important result because it means that when the sampling frequency is sufficiently large with respect to the passbands of the filter networks $N_1$ and $N_2$, a suitable overall transmission characteristic may be computed by any classical design method, by simply assuming that the two networks $N_1$ and $N_2$ are directly in cascade without any resonant transfer circuit elements. Provided this is done with a suitable central capacitance corresponding to $C_3+C_4$. Once the network has been calculated, this central capacitance, on both sides of which structures should remain which give some filtering properties, should simply be split (e.g., equally in the case of a symmetrical network) and the split filters are then those ready to be interconnected as shown in FIG. 1, the resonant transfer characteristic corresponding to that of the time invariant network used for the computation.

So far, a direct resonant transfer connection using lowpass filters has been illustrated and described. It is also known from the British Pat. No. 822,297 that resonant transfer circuit can use the so-called intermediate storage principle whereby it is no longer necessary for the repeatedly operated switches $S_1$ and $S_2$ of FIG. 1 to close in unison.

FIG. 3 shows a partial representation of FIG. 1 illustrating a modified resonant transfer network $N_O$ now adopted to the use of the intermediate storage principle. In its simplest form, the network now comprises a shunt capacitance $C_O$ coupled towards switch $S_1$ through inductance $L_1$ and towards switch $S_2$ through inductance $L_2$, the first serving to bring an energy sample from the left into $C_O$ and the other to withdraw it towards the right, each time by resonant transfer action and reverse operations being of course carried out at the same time if energy has also to pass from the right towards the left.

In such a case, it is known from the above-mentioned Belgian Pat. No. 655,952 that the conversion coefficient $S'_{21n}$ has a somewhat more complex form than given by (1) and its magnitude may be written as $$S'_{21n}=\frac{2\sqrt{R_1R_2}M_1(p)M_2(p+nP)}{\left(\frac{T}{2c_0}+\frac{2C_0Z_{p3}Z_{p4}}{T}\right)\sinh\frac{pT}{2}+(Z_{p3}+Z_{p4})\cosh\frac{pT}{2}} \quad (8)$$

wherein $C_O$ is the intermediate storage capacitance of FIG. 3 and $T$ is the sampling period. It will now be shown that when the sampling frequency is again higher with respect to the passbands involved, it will be possible to design networks $N_1$ and $N_2$ suitable for resonant transfer connections involving intermediate storage by using technique of time invariant filter design.

FIG. 4 shows such a time invariant network derived out of FIG. 1 this time not by omitting resonant transfer network $N_O$ and replacing it by a direct connection shown in dotted lines between terminals 3 and 4, but by inserting between these terminals an all-pass structure shown here in T-configuration and comprising the equal series inductances $T^2/8C_O$ and the series resonant shunt branch formed by a capacitance having the same value $C_O$ as the intermediate storage capacitance in series with a negative inductance $-T^2/16C_O$. Such values will be discussed later, but it will now be demonstrated with the help of FIG. 5 how such a time invariant network as shown on FIG. 4 can be advantageously used for the design of a resonant transfer network defined by FIGS. 1 and 3.

FIG. 5 shows a circuit equivalent to that of FIG. 4. It is on the lines of that of FIG. 2 used for the circuit of FIG. 1 when applying the dotted-line connection between terminals 3 and 4 but this time there is the substitute network AP between the impedances $Z_3$ and $Z_4$, the voltage at the entrance of this network on the side of $Z_3$ being defined by $V'_3$ while that at the entrance on the side of $Z_4$ being labeled $V'_4$, the corresponding currents into the network AP being identified by $I'_3$ and $I'_4$. Hence, the following two network equations may be written $$EM_1=(Z_3+Z_{11})I'_3+Z_{12}I'_4 \quad (9)$$

$$0=Z_{12}I'_3+(Z_{11}+Z_4)I'_4 \quad (10)$$

as shown, $Z_{11}$ being the open circuit impedance on either side of AP, assumed to be a symmetrical network and $Z_{12}$ constituting the transfer impedance.

Considering FIG. 4, by analogy with (7) one may write $$I_2 = M_2 I'_4 \quad (11)$$

remembering that both $I_2$ and $I'_4$ flow towards the left in FIG. 4.

From (5), (9), (10) and (11), the transfer coefficient $S_{21}$ of the network of FIGS. 4 and 5 may be written as $$S_{21}=\frac{2V_2}{E}\sqrt{\frac{R_1}{R_2}}=\frac{2M_1M_2\sqrt{R_1R_2}}{\frac{Z^2_{11}}{Z_{12}}-Z_{12}\quad\frac{Z_3Z_4}{Z_{12}}+\frac{Z_{11}}{Z_{12}}(Z_3+Z_4)} \quad (12)$$

and if the conversion coefficient $S'_{21n}$ defined by (8) is now written for the particular case where n is equal to 0, that is to say lowpass filters at both ends:

$$S'_{210}=\frac{2M_1M_2\sqrt{R_1R_2}}{\left(\frac{T}{2C_0}+\frac{2C_0Z_3Z_4}{T}\right)\sinh\frac{pT}{2}+(Z_3+Z_4)\cosh\frac{pT}{2}} \quad (13)$$

it will be recognized that (12) and (13) are of the same nature, i.e., that the numerators are identical whereas the denominators contain terms in $Z_3=Z_4$, in $Z_3Z_4$ and a third term independent of $Z_3$ and $Z_4$. In order to achieve complete identity between $S_{21}$ and $S'_{210}$, three equations must naturally be satisfied and it will be found that this will occur if $Z_{11}$ and $Z_{12}$ are defined by $$Z_{11}=\frac{T}{2C_0}\coth\frac{pT}{2}=\frac{T}{2C_0}\frac{1}{\tanh\frac{pT}{2}} \quad (14)$$

$$Z_{12}=\frac{T}{2C_0\sinh\frac{pT}{2}}=\frac{T}{2C_0}\frac{\sqrt{1-\tanh^2\frac{pT}{2}}}{\tanh\frac{pT}{2}} \quad (15)$$

thus in terms of the intermediate storage capacitance $C_o$ and of the sampling period $T$. The second expressions which have been given above for $Z_{11}$ and $Z_{12}$ are written in terms of *tanh* $pT/2$ since this will facilitate a derivation of further values for $Z_{11}$ and $Z_{12}$. Indeed, in the case of a sufficiently high sampling frequency, *tanh* $pT/2$ is approximately equal to $pT/2$ and the values of $Z_{11}+Z_{12}$ and $Z_{11}-Z_{12}$ will be calculated from (14) and (15) using this approximate value for the case considered. This gives $$Z_{11}+Z_{12}=\left(\frac{T}{2C_0}\right)\frac{1+\sqrt{1-\tanh^2\frac{pT}{2}}}{\tanh\frac{pT}{2}}=\frac{2}{pC_0} \quad (16)$$

$$Z_{11}-Z_{12}=\left(\frac{T}{2C_0}\right)\frac{1-\sqrt{1-\tanh^2\frac{pT}{2}}}{\tanh\frac{pT}{2}}=\frac{pT^2}{8C_0} \quad (17)$$

from which it is recognized that $Z_{11}+Z_{12}$ corresponds to a capacitance of value $C_o/2$ while $Z_{11}-Z_{12}$ is equivalent to an inductance of value $T^2/8C_o$ and are thus the elements of an all-pass lattice structure involving two such capacitances and two such inductances. This lattice structure is not shown, but it will be recognized that the T-structure represented in FIG. 4 for network AP shown in FIG. 5 has impedance values corresponding to this lattice structure, the shunt impedance branch $Z_{12}$ being readily obtained from (16) and (17), i.e., $$Z_{12} = \frac{1}{pC_0} - \frac{pT^2}{16C_0} \qquad (18)$$

Thus, FIG. 4 indicates that in order to design filter networks, for resonant transfer circuits using the intermediate storage principle, a time invariant network should be selected such that it includes two central shunt capacitances or at least capacitive elements able to correspond to such shunt capacitances $C_3$ and $C_4$ at high frequency, separated by an all-pass structure. After the overall time invariant network made up of $N_1$ in cascade with AP and with $N_2$ has been designed by using known techniques, the all-pass structure AP can be omitted and the networks $N_1$ and $N_2$ are ready to operate in a resonant transfer network of the type shown by FIG. 1 and 3 with the computed characteristics.

It will now be shown that the filters described need not be restricted to the voice frequency bandwidth since the results derived so far can be found to be applicable to bandpass filters. Since the resonant transfer process is essentially a suppressed carrier system, one may, for instance, examine the conversion from a low-frequency signal to a double-sideband-suppressed-carrier signal. In this case, network $N_1$ will still be a lowpass filter as shown in FIG. 1 but $N_2$ will now be a bandpass filter. If it is assumed that its center frequency is equal to the fundamental of the sampling frequency $W$, the frequency variable $p$ can be replaced by $p'$ *using the following transformation*

$$p' = \frac{p^2 + W^2}{2p} \doteq p \mp P \qquad (19)$$

in which the second approximate form is valid for values of $w$ in the neighborhood of $\pm W$ respectively, recalling that narrow band circuits with values of $w$ substantially smaller than $W$ are being considered.

If this frequency transformation is applied to the lowpass filter of $N_2$ which was identical to that shown for $N_1$ in FIG. 1, it will be transformed into a bandpass filter having $W$ as center frequency and a bandwidth equal to twice the cutoff frequency of the original lowpass filter. An impedance transformation should also be made with respect to network $N_2$, i.e., the impedance level should be divided by 2, this being also applicable to the terminating resistance $R_2$ for $N_2$.

FIG. 6 shows the terminated network $N_2$ when the above two transformations have been applied. They can be readily illustrated in relation to the capacitance $C_C$ on the side of terminals 4–4′ which now becomes the impedance $$\frac{1}{2p'C_C} = \frac{1}{2\left(\frac{p^2+W^2}{2p}\right)C_C} = \frac{1}{pC_C + \frac{W^2C_C}{p}} \qquad (20)$$

by making use of (19) and simultaneously by halving the impedance level. It will readily be recognized from the last form given by (20) that capacitance $C_C$ now becomes capacitance $C_C$ in parallel with the inductance $1/W^2C_C$. The other elements of the filter are transformed in a like manner and the series branch which now contains two inductances and two capacitances instead of the antiresonant circuit $L_AC_A$ of FIG. 1 exhibits a series resonance at $W$ surrounded by two antiresonant frequencies given by $$\sqrt{W^2 + \frac{1}{L_A^2C_A^2}} \mp \frac{1}{\sqrt{L_AC_A}} \doteq W \mp \frac{1}{\sqrt{L_AC_A}} \qquad (21)$$

where the second approximate value is due to the large value of $W$ and clearly shows the doubling of the bandwidth with respect to the lowpass filter.

The output impedance $Z'_4(p)$ seen into network $N'_2$ is now given by $$Z'_4(p) = \frac{1}{2} Z_4\left(\frac{p^2+W^2}{2p}\right) \qquad (22)$$

in view of the impedance and frequency transformations explained, while the open circuit voltage ratio at terminals 4–4′ is defined by $$M'_2(p) = M_2\left(\frac{p^2+W^2}{2p}\right) \qquad (23)$$

the impedance transformation, effective also for the terminating resistance, having of course no influence on that ratio.

It is quite clear from the capacitances appearing in FIG. 6 and which are the same as those for $N_1$ in FIG. 1, that the resonant transfer capacitance $C_4$ of FIG. 1 has remained unchanged since it is the capacitance seen into $N'_2$ (FIG. 6) at high frequency where the inductance $L_A/4$ masks the additional capacitance $4/W^2L_A$. But this can readily be proved in an absolutely general manner irrespective of a particular filter structure:

$$\frac{1}{C'_4} = \lim_{p\to\infty} pZ'_4(p) = \frac{1}{2}\lim_{p\to\infty} pZ_4(p')$$

$$= \lim_{p\to\infty} \frac{p^2p'}{p^2+W^2} Z_4(p') = \frac{1}{C_4} \qquad (24)$$

The above expression defines in the usual way the resonant transfer capacitance $C'_4$ in function of the impedance $Z'_4(p)$ at infinite frequency. The second form for the inverse of the capacitance $C'_4$ follows immediately by making use of (22) and remembering (19). The third expression is then obtained by again making use of (19) and noting therefrom that as $p$ tends towards infinity, this is also true for $p'$. Hence, considering this third expression, the factor multiplying $Z_4(p')$ is simply $p'$ when $p$ tends towards infinity so that the limit with $p'$ as variable is the inverse of capacitance $C_4$. This justifies the transformations used which leave the resonant transfer operation unaffected.

For the new overall circuit of FIG. 1 using for $N_2$ the bandpass filter of FIG. 6 together with the halved termination $R_2/2$, the conversion coefficient of order $n$ will thus be as defined by (1) in which $M_2(p+nP)$ as well as $Z_{p4}$ should be replaced by $M'_2(paznp)$ and $Z'_{p4}$ respectively. This new pulse impedance $Z'_{p4}$ is of course again given by an expression similar to (2), i.e., $$Z'_{p4} = \sum_{m=-\infty}^{\infty} Z'_4(p+mP) = \frac{1}{2}\sum_{m=-\infty}^{\infty} Z_4\left[\frac{(p+mP)^2-P^2}{2(p+mP)}\right]$$

$$= \frac{1}{2}\sum_{m=-\infty}^{\infty} Z_4 \frac{(p+mP+P)(p+mP-P)}{2(p+mP)}$$

$$= \frac{1}{2} Z_4\left(p\frac{p+2P}{2p+2P}\right) + \frac{1}{2} Z4\left(p\frac{p-2P}{2p-2P}\right) + \ldots$$

$$\ldots + \frac{1}{2} R_4 \frac{(w^2-W^2)}{2w} + \frac{1}{2} X_4\left(\frac{w^2-W^2}{2w}\right) + \ldots$$

$$\ldots + \frac{1}{2}\sum_{m=2}^{\infty} [R_4(W_1)+R_4(W_2)] + \frac{1}{2}\sum_{m=2}^{\infty} [X_4(W_1)-X_4(W_2)] \qquad (25)$$

wherein the auxiliary frequency parameters $W_1$ and $W_2$ are defined by $$2W_1 = mW + w - \frac{W^2}{mW+w} \qquad (26)$$

$$2W_2 = mW - w - \frac{W^2}{mW-w} \qquad (27)$$

The second expression for $Z'_{p4}$ readily follows by making use of (22). The third expression covers a rearrangement of the numerator of the frequency function to express it as the product of two factors. Finally, the fourth and last expression for $Z'_{p4}$ is obtained by carrying out the summation for the values of $m$ equal to +1 and −1 which produce the first two terms of the fourth expression. The next two terms correspond to the value of $m$ equal to 0 and accordingly the last two summations must be carried out for positive and negative integral values of $m$ from 2 to infinity. As in the case of the analysis for the lowpass filter, apart from the first two terms, the impedances have been split into resistive and reactive components the former being still an even function of the frequency going to zero at least as fast as $1/w^2$ when the frequency tends towards infinity, while the second is an odd function of frequency going to zero as fast as $1/w$. From the fourth expression for $Z'_{p4}$ given above, it can again be verified, as in the case of the lowpass filter, that for $W$ going to infinity all the terms will vanish except the first two.

THus, it is clear from the latter that with a sufficiently narrow bandwidth and with $p$ much smaller than $P$, the impedances of the first two terms are simply function of $p$ so that the sum of these first two terms is $Z_4(p)$.

Since it has now been shown that $Z'_{p4}$ is equal to $Z_4$, it is only necessary to find the value of $M'_2$ in order to be able to compute the conversion coefficient in terms of the transfer coefficient identified by (1). In view of the frequency transformation chosen, i.e., that defined by (19) the useful modulation products are the upper and lower sideband of the fundamental sampling frequency, i.e., $n=\pm1$. Thus, an expression for $M'_2(p\pm P)$ has to be derived. But, in view of the approximation obtained for the frequency transformation and defined by (19), it is clear from (23) that for a frequency much lower than the sampling frequency, $M'_2(p\pm P)$ is substantially equal to $M_2(p)$. Thus, the conversion coefficient $S_{21,1}(p)$ and $S_{21,-1}(p)$ for the two sidebands are given by $$S_{21,1}(p)=S_{21,-1}(p)=\frac{S_{21}(p)}{\sqrt{2}} \qquad (28)$$

the denominator of the expression in term of $S_{21}(p)$ corresponding of course to the halving of the terminating resistance $R_2$ and to the fact that each sideband contains only half of the total energy transmitted.

While it has been assumed above that the useful sidebands are $W+w$, the theory can be shown to be still valid if $nW\pm w$ are chosen with $n$ being any positive integer. In this case, the transformation defined by (19) would be replaced by $$p'_n=\frac{p^2+n^2W^2}{2p} \qquad (29)$$

where $p'_n$ would this time be the new frequency variable. Again, the conditions would be: narrow band circuits with $w$ much smaller than $W$. Thus, a double sideband frequency division carrier system, for instance, could readily be designed with carrier frequencies of 64, 72, 80 kc./s. etc., to put the corresponding voice bands into the 60–108 kc./s. carrier band. While the principles of the invention have been described above in connection with specific apparatus, it is to be clearly understood that this description is made only by way of example and not as a limitation on the scope of the invention.

I claim:

1. Resonant transfer circuits including first ($N_1$) and second ($N_2$) networks each with energy storage means ($C_3$, $C_4$) and interconnected on a resonant transfer basis by a resonant transfer network ($N_O$) including at least a reactive element (L) and repeatedly operated switching means ($S_1$, $S_2$) said switching means enabling said resonant transfer network to effectively interconnect said energy storage means during short time intervals to enable their respective stored energies to be mutually interchanged during such time intervals, the transfer characteristic of the resonant transfer connection being substantially equal to the transfer characteristic of a modified time invariant circuit, and said modified circuit includes said first and second filter networks interconnected without the intermediary of said resonant transfer network;

said resonant transfer network, in the case of an indirect resonant transfer connection, includes intermediate energy storage means ($C_O$), and said modified network is constituted by the interconnection of said first and second filter networks through an all-pass network (AP); and said all-pass network (AP) corresponds to a lattice structure with capacitances $C_o/2$ and inductances $T^2/8C_o$ where $C_o$ represents the value of the intermediate storage capacitance and $T$ the sampling period.

2. Resonant transfer circuits as claimed in claim 1, wherein said filter networks include bandpass filters.

3. Resonant transfer circuits as claimed in claim 1 wherein said filter networks include lowpass and bandpass filters.

4. Resonant transfer circuits as claimed in claim 2 wherein said bandpass filters include a double sideband bandpass filter.

5. Resonant transfer circuits as claimed in claim 1 wherein the output impedances $Z(p)$ of said filter networks as seen from said resonant transfer network are capacitive at high frequency.

* * * * *